Dec. 17, 1957  S. TANAY  2,816,667
SUPPORTING AND RESEALING DEVICE FOR JARS
AND SIMILAR RECEPTACLES
Filed Nov. 10, 1955
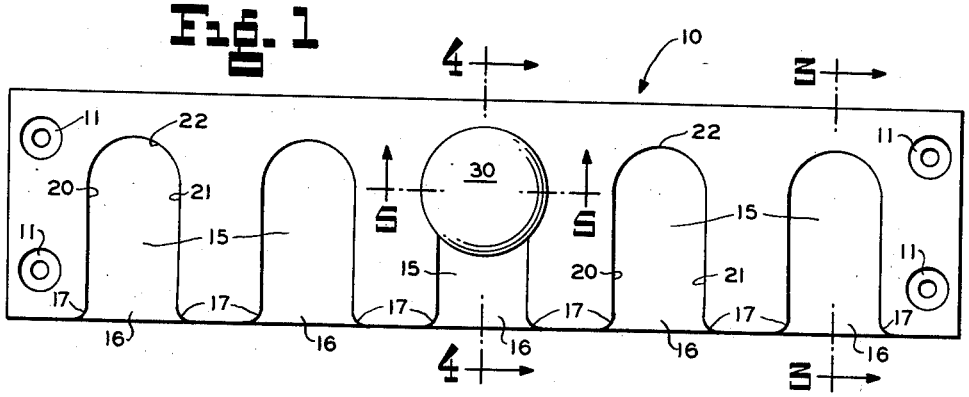
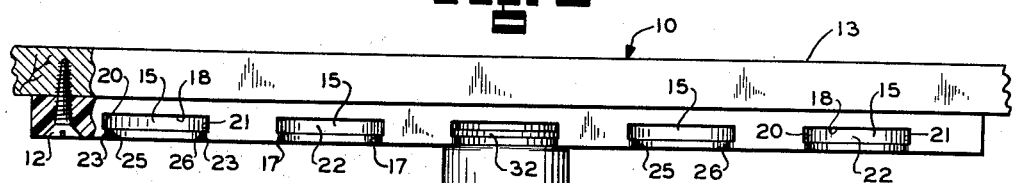
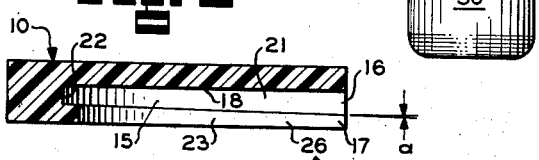
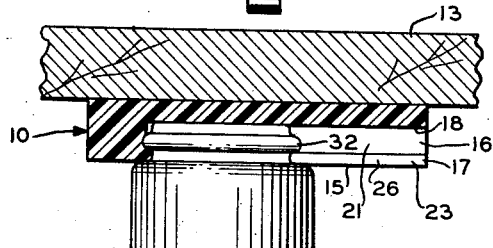
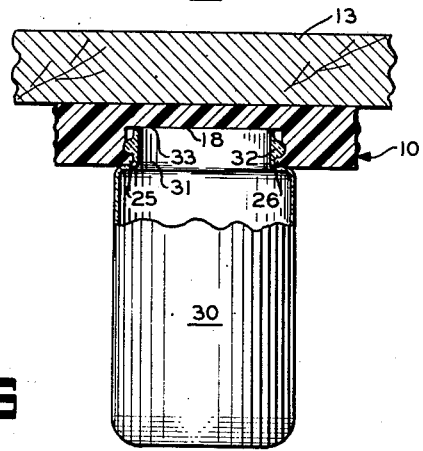
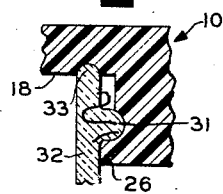
INVENTOR.
STEPHEN TANAY
BY
*Philip S. H*...
ATTORNEY United States Patent Office 2,816,667
Patented Dec. 17, 1957

2,816,667

SUPPORTING AND RESEALING DEVICE FOR JARS AND SIMILAR RECEPTACLES

Stephen Tanay, Farmingdale, N. J.

Application November 10, 1955, Serial No. 546,095

1 Claim. (Cl. 211—76)

The present invention relates to a rack-like supporting device for use with jars and the like and which maintains the jars in a sealed, airtight condition while supported in the rack.

There are presently on the market many commodities such as baby foods, sauces, condiments and other items which are packaged in glass jars having an annular ridge formed around the neck of the jar. The jar is sealed by a non-threaded cap which is removed by means of a lifter, a bottle opener or similar device when access to the contents of the jar is desired. Frequently the cap is deformed in the course of its removal so that the jar cannot be resealed by means of the cap.

It is an object of the present invention to provide a supporting rack for jars of this type which may be filled or partially filled, the rack being provided with means for keeping the jars positively sealed while supported in the rack.

Any jar may be readily removed from the rack and conveniently replaced therein at will, the jar being automatically sealed at the same time that it is inserted or reinserted in the rack.

Generally, the invention comprises an elongated body formed of material which is sufficiently resilient to provide a positive seal for the open mouth of each jar and yet sufficiently rigid to hold the jars securely supported. The body is adapted to be secured to the under side of a shelf, or it may be otherwise supported, as by a frame provided with legs or other structure, if desired. The under side of the body has a series of downwardly opening jar retaining recesses formed therein, the recesses being open at one side of the body for the convenient insertion and removal of jars. Each recess has parallel side walls and terminates in a semicircular closed end portion. A U-shaped bead or retaining ridge extends around the lower periphery of each recess for engagement with the annular ridge on the neck of the jar. When a jar is positioned in one of the recesses, it is forced upwardly by the retaining ridge so that its open mouth is pressed against the upper wall of the recess and the resiliency of the material of which the body is formed causes the jar mouth to be sealed closed in an air-tight and moisture-proof manner by the top wall of the recess.

Various further objects, features and advantages of the invention will become apparent upon reading the following specification together with the accompanying drawing forming a part hereof.

Fig. 1 in the drawing is a bottom view of an embodiment of the invention showing a single jar positioned in one of the retaining recesses;

Fig. 2 is a side elevational view of the embodiment illustrated in Fig. 1, showing the device secured to the under side of a shelf for support thereby;

Fig. 3 is a transverse sectional view taken along the line 3—3 of Fig. 1, looking in the direction of the arrows;

Fig. 4 is a transverse sectional view taken along the line 4—4 of Fig. 1, looking in the direction of the arrows and including a sectional view of the shelf shown in Fig. 2;

Fig. 5 is a fragmentary sectional view in side elevation taken along the line 5—5 of Fig. 1 and including a fragment of the shelf shown in Fig. 2;

Fig. 6 is an enlarged fragmentary sectional view showing the sealing action of the resilient top wall of a jar retaining recess when pressed against the lip of an open-mouthed jar held within the recess.

Referring to Fig. 1, the device is illustratively shown as comprising an elongated body in the form of a flat slat or plate designated generally as 10 which is of substantially rectangular configuration. The body 10 is preferably molded in one piece or otherwise formed of stiff yet resilient material such as a synthetic resin, semi-hard rubber or other suitable plastic material. The body 10 is shown provided with countersunk mounting holes 11 adapted to receive a plurality of flat-headed wood screws 12, for example, to secure the body 10 to the under side of a shelf 13, as illustratively indicated in Fig. 2. Any other form of supporting means for the body 10 may be used, if desired.

The body 10 has a series of retaining recesses or passageways, each designated generally as 15, formed in the under side thereof. Each retaining recess 15 opens laterally outwardly toward one side of the body 10 as indicated at 16, each opening 16 being provided with rounded corners 17 for guiding a jar into the recess. Each recess 15 is open at its bottom and is closed at its top by a resilient flat top wall 18 formed by the resilient material of the body 10.

Each recess 15 comprises spaced parallel side walls 20 and 21 and is closed at the end opposite its opening 16 by a semicircular end wall 22. A U-shaped bead designated generally as 23 extends continuously around the lower edges of the walls 20, 21 and 22, with its leg portions 25 and 26 forming spaced parallel retaining ridges for supporting a jar in the recess 15. The upper surfaces of the retaining ridges 25 and 26 are preferably inclined upwardly at a small angle $a$ (Fig. 3) along side walls 20 and 21 from opening 16 toward the flat top wall 18 as by thickening the bead 23 progressively toward the end wall 22 so that its lower edges are flush with the under surface of the body 10.

A circular open-mouthed jar designated generally as 30 is shown mounted in one of the retaining recesses 15. The jar 30 has a neck portion 31. An annular ridge 32 is integrally formed on the jar neck 31 and extends continuously therearound to encircle the neck portion of the jar 30.

The device is so dimensioned that the retaining ridges 25 and 26 will fit under the annular ridge 32 of the jar 30 and hold the jar in any one of the retaining recesses 15. The upward inclination of the upper surfaces of the retaining ridges 25 and 26 urges the jar progressively upwardly as its neck portion is laterally pressed more and more deeply into recess 15, the clear space indicated at 20, 21, Figs. 2, 3 and 4, above these ridges enabling free upward movement of the jar necessary to seal the mouth against the flat top sealing surface. Even though the upwardly inclined surfaces of retaining ridges 25 and 26 are not parallel to the top wall 18 of the recess 15, the jar is properly sealed because it is effectively pivotally supported by the engagement of diametrically opposed portions of the annular ridge 32 with the retaining ridges 25 and 26 so that it may swing about an axis extending transversely of the recess 15 between side walls 20 and 21. This permits the lip 33 of the circular mouth of the jar 30 to be pressed firmly and continuously into engagement with the flat resilient top wall 18 throughout the entire circumference of the lip 33. Because of the resiliency of the material from which body 10 is formed, the lip 33 will be partially imbedded in the top wall 18, as shown on an exaggerated scale in Fig. 6, thus providing an airtight and moisture-proof seal for the protection of the contents of the jar.

While preferred embodiments of the invention have been illustrated, it will be apparent that many changes and modifications may be made without departing from the spirit and scope of the invention as defined in the appended claim.

What is claimed is:

A supporting and sealing device for a jar having a cylindrical neck portion with a circular lip at the upper end defining an open mouth and an annular ridge encircling said neck portion spaced below said lip, said device comprising a one-piece flat plate of stiff, resilient material having means enabling attachment of the same to the underside of a shelf or other support, said plate having a continuous horizontal flat top surface and having a U-shaped passageway in the underside of the same defined by a horizontal surface spaced below and substantially parallel to said top surface and by upright side walls restricting the passageway to the approximate width of the neck of the jar and with the side walls characterized by an inwardly extending U-shaped ridge at the bottom having the outline of the neck of the jar at the inner extremity and being parallel adjacent the outer extremities adjacent the open end of the passageway, the ridge so formed being planar and being closer to said horizontal top surface at the inner part of the passageway to pinch the jar neck up against said horizontal top surface.

References Cited in the file of this patent

UNITED STATES PATENTS

| 2,480,411 | Kennedy | Aug. 30, 1949 |
| 2,711,830 | Howell | June 28, 1955 |
| 2,754,009 | Kennedy | July 10, 1956 |